United States Patent

Shoji et al.

[11] Patent Number: 5,898,743
[45] Date of Patent: Apr. 27, 1999

[54] DIGITAL RADIO COMMUNICATIONS RECEIVER

[75] Inventors: Takanori Shoji; Yasuyuki Nagashima; Masayuki Doi, all of Tokyo, Japan

[73] Assignee: Mitsubishi Denki Kabushiki Kaisha, Japan

[21] Appl. No.: 08/738,796

[22] Filed: Oct. 28, 1996

[30] Foreign Application Priority Data

Mar. 12, 1996 [JP] Japan .................................. 8-055015

[51] Int. Cl.⁶ .............................. H04J 3/06; H04J 3/14
[52] U.S. Cl. ........................................ 370/514; 375/365
[58] Field of Search .................................. 370/512, 513, 370/514, 503, 509, 510, 511, 515, 520, 527, 528, 504, 522, FOR 169, FOR 175, FOR 178, FOR 184, FOR 188, FOR 187, 252, 350, 310; 375/354, 357, 365, 366, 367, 368; 340/825.06, 825.14, 825.17, 825.2

[56] References Cited

U.S. PATENT DOCUMENTS

| | | | |
|---|---|---|---|
| 5,109,393 | 4/1992 | Saegusa | 370/514 |
| 5,450,413 | 9/1995 | Hazama | 370/514 |
| 5,550,833 | 8/1996 | Fijisawa | 370/514 |
| 5,619,507 | 4/1997 | Tsuda | 370/514 |

OTHER PUBLICATIONS

"Radio Transmission in the American Mobile Satellite System", American Institute of Aeronautics and Astronautics, Inc., pp. 280–294 (1994).

"Personal Handy Phone System", Research & Development Center for Radio Systems (RCR), RCR Standard Version 1, RCR STD–28, pp. 67, 78, 93 (1993).

Primary Examiner—Huy D. Vu
Attorney, Agent, or Firm—Rothwell, Figg, Ernst & Kurz, p.c.

[57] ABSTRACT

A digital radio communications receiver for predicting correctly a frame structure and assuring correct synchronization. The digital radio communications receiver for use in a digital communications system having two or more frame structures on a single channel, comprises a unique word detector module for detecting a unique word from a received bit string, a receive timing controller for timing controlling a received frame based on the unique word detection information from the unique word detector module, a frame structure determining module for determining the frame structure based on the unique word detection information from the unique word detector module and the frame structure determining guard level, and a frame structure determining guard level setting module for setting the frame structure determining guard level that is the number of consecutive detections of the frame structure in frame structure determination conditions and outputting the resulting guard level to the frame structure determining module, whereby the probability of erroneous detection of the frame structure is lowered by recognizing a change in the frame structure and by outputting the information about the new frame structure.

7 Claims, 16 Drawing Sheets

DIGITAL RADIO COMMUNICATIONS RECEIVER

BACKGROUND OF THE INVENTION

1. Field of the Invention

The present invention relates to a digital radio communications receiver that predicts the structure of a received frame based on the phase and intervals of sync words picked up.

2. Description of the Related Art

In digital radio communications, correctly received information is extracted by detecting a received signal to extract received bit string and picking up a frame timing in the received bit string.

Typically, the detection of the frame timing and frame synchronization are performed by detecting a bit string that exhibits an outstanding autocorrelation in a predetermined position in frames, namely, by detecting a sync word.

A sync word is also referred to as a unique word, and the unique word is abbreviated UW in the drawings and the discussion that follows.

A unique word is detected by comparing a received bit string with the unique word bit string prepared at a receiver end. An unmatched bit count between both strings equal to or smaller than a predetermined threshold (hereinafter referred to as correlation threshold) determines that a unique word is detected.

On the other hand, an unmatched bit count at the timing of the unique word exceeds the correlation threshold determines that a unique word is missed.

When a frame synchronization is established, the receiver is capable of approximately predicting the position of the unique word. When the frame synchronization is established, a gate called an aperture is set up, and the probability of erroneous detection of the unique word is kept lowered by performing the valid detection of the unique word on or in the vicinity of the position of the unique word.

The frame synchronization is established by detecting the unique word at the predetermined positions for the specified number of consecutive frames. This operation is called backward guard and the specified number of frames is called the backward guard level. As the backward guard level is increased, the erroneous frame synchronization is less likely to take place, making higher the reliability of frame synchronization, but the time required to establish the frame synchronization gets longer. Conversely, as the guard level is decreased, the time required to establish the frame synchronization gets shorter but the erroneous frame synchronization is more likely to take place.

The detection of a frame missynchronzation is performed by verifying that the unique word is consecutively missed for the specified number of frames at the position where the unique word is supposed to appear. This operation is called forward guard, and the specified number of frames is called the forward guard level. As the forward guard level is increased, the probability of frame missynchronization due to degradation of channel quality or the like is reduced, but the time required to detect the frame missynchronization, when it actually takes place, is prolonged. Conversely, as the forward guard level is decreased, the time required to detect the frame missynchronization is shortened while the probability of the determination that a missynchronization is erroneously detected is heightened even in the situation where the frame synchronization needs to be maintained.

Some digital radio communications systems change the frame structure depending on communications conditions. For example, in the system employing a voice activation technique, frames are transmitted only when voice remains significant, and no frames are in principle transmitted when no voice is recognized. In such a case, however, to maintain frame synchronization, a short burst containing a unique word is transmitted at regular intervals. Typically, this interval is different from the frame length.

When the frame structure changes depending on communications conditions as described above, a transmitter end is required to notify of the change in the frame structure. Available as methods of notifying of frame structure changes are one in which a predetermined bit string is set up for notifying of the frame structure in a frame and another method in which a bit string (hereinafter referred to as a frame structure flag) for notifying a change, when it takes place, is inserted.

FIG. 12 is a block diagram showing the configuration of a privately known but unpublished art digital radio communications receiver which performs frame synchronization and frame structure prediction.

Referring to FIG. 12, a unique word detector module 1 detects a unique word from a received bit string, based on the timing information from an aperture control module to be described later and the correlation threshold from a correlation threshold setting module to be described later. The radiowave received by a receiving antenna 100 is fed to a down-converter 101 which outputs a signal in an intermediate frequency bandwidth. A detector 102 detects the intermediate frequency signal and then outputs the received bit string to the unique word detector module 1. The aperture control module 2 outputs the timing information that controls the timing at which the unique word detector module 1 attempts to detect the unique word. In response to the aperture width from an aperture width setting module to be described later and the received timing information from a timing control module to be described later, the aperture control module 2 generates the timing information that is output to the unique word detector module 1.

There are further shown in FIG. 12 the timing control module 3 that outputs the receive timing information of the received signal in response to the unique word detection information from the unique word detector module 1, a frame synchronization guard level setting module 4 that sets frame synchronization determination conditions, namely, the backward guard level that is the number of consecutive detections of unique word and the forward guard level that is the number of consecutively misses of unique word (both levels are hereinafter collectively referred as the guard level), and a frame synchronization determining module 5 that results in the frame synchronization information, based on the unique word detection information from the unique word detector module 1 and the guard level from the frame synchronization guard level setting module 4.

There are yet further shown in FIG. 12 an aperture width setting module 6 that sets an aperture width as a time width within which the unique word detector module 1 attempts to detect a unique word, based on the unique word detection information from the unique word detector module 1 and the frame synchronization information from the frame synchronization determining module 5, a correlation threshold setting module 7 that sets the correlation threshold of unique word detection conditions, based on the unique word detection information from the unique word detector module 1 and the frame synchronization information from the frame synchronization determining module 5, a received signal extractor module 8 that extracts the received signal from the received bit string output by the detector 102 at the timing designated by the timing control module 3, and a frame structure determining module 9 for detecting the frame structure flag of the received signal to determine whether or not the frame structure changes.

The operation of the known digital radio communications receiver thus constructed is now discussed.

The radiowave received at the receiving antenna 100 is converted into an intermediate frequency signal, which is then fed, as a received signal by the down converter 101, to the detector 102. The detector 102 demodulates the received signal and outputs the received bit string.

The unique word detector module 1 receives the received bit string, correlates the received bit string with the unique word at the timing set by the aperture control module 2, detects the unique word and determines the phase of the unique word from the number of erratic bits and their correlation threshold, and then outputs the determination results as the unique word detection information.

The timing control module 3 controls the receive timing based on the unique word detection information.

The frame synchronization determining module 5 determines the frame synchronization state using the number of consecutive detections/misses of the unique word of the unique word detection information designated by the guard level setting module 4, and outputs the determination results as the frame synchronization information.

Referring to the unique word detection information and the frame synchronization information, the aperture width setting module 6 sets and outputs the aperture width that is used at the next attempt to detect the unique word.

Referring to the unique word detection information and the frame synchronization information, the correlation threshold setting module 7 sets and outputs the correlation threshold that is used at the next attempt to detect the unique word.

To determine whether the frame structure changes, the frame structure determining module 9 detects the frame structure flag indicative of the frame structure of the received signal that is extracted by the received signal extractor module 8 from the received bit string output by the detector 102 at the timing designated by the timing control module 3.

Discussed next is how the frame structure is recognized when the known art digital radio communications receiver performs frame synchronization control.

FIG. 13 shows an example of the change in the frame structure depending on communications conditions. Part of FIG. 13 herein shows a simplified version of FIG. 2 that is presented in a paper entitled "RADIO TRANSMISSION IN THE AMERICAN MOBILE SATELLITE SYSTEM" (A COLLECTION OF TECHNICAL PAPERS, AIAA-94-0945-CP, pp 280–294, 1994).

FIG. 13 shows a unique word 17, a frame structure flag 18-a indicative of a frame structure 1 and inserted at the change from a frame structure 2 to the frame structure 1, and a frame structure flag 18-b indicative of the frame structure 2 and inserted at the change from the frame structure 1 to the frame structure 2.

In the frame structure in FIG. 13, a unit or interval of the frame structure 1 delimited by unique words is called a subframe, and four subframes make up a frame. The interval between unique words in the frame structure 2 is identical to the frame length. In FIG. 13, in other words, the frame structure 1 has a unique word on a per subframe basis, and the frame structure 2 has a unique word on a per frame basis.

FIGS. 14 and 15 show examples of the recognition of the frame structure in which when the frame structure changes, a frame structure flag notifying of it is transmitted only once. FIG. 14 shows the example of the false detection of a frame structure flag, and FIG. 15 shows the example of a miss of a frame structure flag.

In FIG. 14, the frame structure determining module 9 suffers the false detection of a frame structure flag and thus erroneous determination of frame structure. The frame structure determining module 9 thus remains unable to receive a frame structure flag and thus unable to recognize correctly the frame structure until the frame structure is changed next.

In FIG. 15, the frame structure determining module 9 misses a frame structure flag and erroneously determines the frame structure. In this case, again, the frame structure determining module 9 remains unable to recognize correctly the frame structure until the next change in frame structure.

FIG. 16 shows an example of the effect of the above faulty determinations.

In the detection failure of the frame structure flag in FIG. 16, the frame synchronization forward guard level is 2.

As shown in FIG. 16, with the miss of the frame structure flag, the receiver attempts to receive the frame structure 1 though the frame is already changed from frame structure 1 to frame structure 2. Since the unique word interval is different between the frame structure 1 and the frame structure 2, the receiver suffers a detection failure of unique word in an attempt to detect the unique word with the unique word interval of the frame structure 1. Such a state continues until the frame is changed from frame structure 2 to frame structure 1, and it is highly likely that a missynchronization would take place in the course of repeated detection failures of the unique word.

In the known digital radio communication receiver thus constructed, when the flag notifying of the change in the frame structure is transmitted only once, followed by the failed or false detection of the flag, the receiver remains unable to correctly recognize the frame structure until the frame structure changes later again. Furthermore, the faulty recognition of the frame structure may cause the frame synchronization control to malfunction, possibly leading to a missynchronization.

SUMMARY OF THE INVENTION

The present invention has been developed to solve this problem, and it is therefore an object of the present invention to provide a digital radio communications receiver that predicts correctly a frame structure and assures correct frame synchronization.

To achieve the above object, the digital radio communications receiver of the present invention for use in a digital communications system having two or more frame structures on a single channel, comprises unique word detector means for detecting a unique word from a received bit string, receive timing control means for timing controlling a received frame timing based on the unique word detection information from the unique word detector means, frame structure determining means for determining a frame structure based on the unique word detection information from the unique word detector means and based on frame structure determining guard level, and a frame structure determining guard level setting means for setting the frame structure determining guard level that is the number of consecutive detections of the frame structure in frame structure determination conditions and outputting the resulting guard level to the frame structure determining means, whereby the probability of false detection of the frame structure is lowered by recognizing a change in the frame structure and by outputting the information about the new frame structure.

Receiving the unique word detection information from the unique word detector means, the frame structure determining means determines the frame structure. When the frame structure changes, frame structure information is output on condition that the new frame structure is detected consecutively by the guard level set by the frame structure determining guard level setting means and the frame structure is thus determined based on the state of the unique word characteristic of the frame structure, such as the detected intervals of the unique word (or phase of the unique word). The frame structure is recognized independently of the signal indicative of the switching of the frame structure. When the new frame structure is detected consecutively by the guard level set by the frame structure determining guard level setting module, the frame structure change is recognized, and new frame structure information is output. Thus, the probability of false detection of the frame structure is lowered and correct frame synchronization is assured.

The receiver further comprises frame synchronization determining means for determining the establishment of the synchronization of the received frame based on the unique word detection information from the unique word detector means and for outputting the determination results as frame synchronization information. The frame synchronization determining means achieves frame synchronization in synchronization procedure appropriate for the frame structure by selecting the procedure of the frame synchronization control based on the frame structure information from the frame structure determining means. A stable frame synchronization is thus assured.

The receiver further comprises frame synchronization control parameter setting means for setting frame synchronization parameters based on the frame structure information from the frame structure determining means, and feeding them back into synchronization control information of the received frame. Thus, frame synchronization control is performed by using the synchronization control parameters appropriate to the state of the frame structure, and a flexible and reliable frame synchronization is assured.

The receiver comprises, as the frame synchronization control parameter setting means, the frame synchronization guard level setting means for setting, as the frame synchronization control parameter, the frame synchronization guard level that is the number of consecutive detections or the number of consecutive misses of the unique word of frame synchronization determination conditions. The frame synchronization guard level is set according to the length of the frame, the length of the unique word and the switching of the bit pattern. Thus, a flexible and reliable frame synchronization is assured.

The receiver comprises, as the frame synchronization control parameter setting means, aperture width setting means for setting, as the frame synchronization control parameter, the aperture width that is a time width for the valid operation of unique word detection. The aperture width is set according to the frame length that is changed at the switching of the frame structure and variations in the transmission clock stability. A flexible and reliable frame synchronization is assured.

The receiver comprises, as the frame synchronization control parameter setting means, correlation threshold setting means for setting, as the frame synchronization control parameter, the correlation threshold as unique word detection conditions. The correlation threshold is set according to the frame length that is changed at the switching of the frame structure and variations in unique word length. A flexible and reliable frame synchronization is thus assured.

DESCRIPTION OF THE PREFERRED EMBODIMENTS

Embodiment 1

Figure 1:
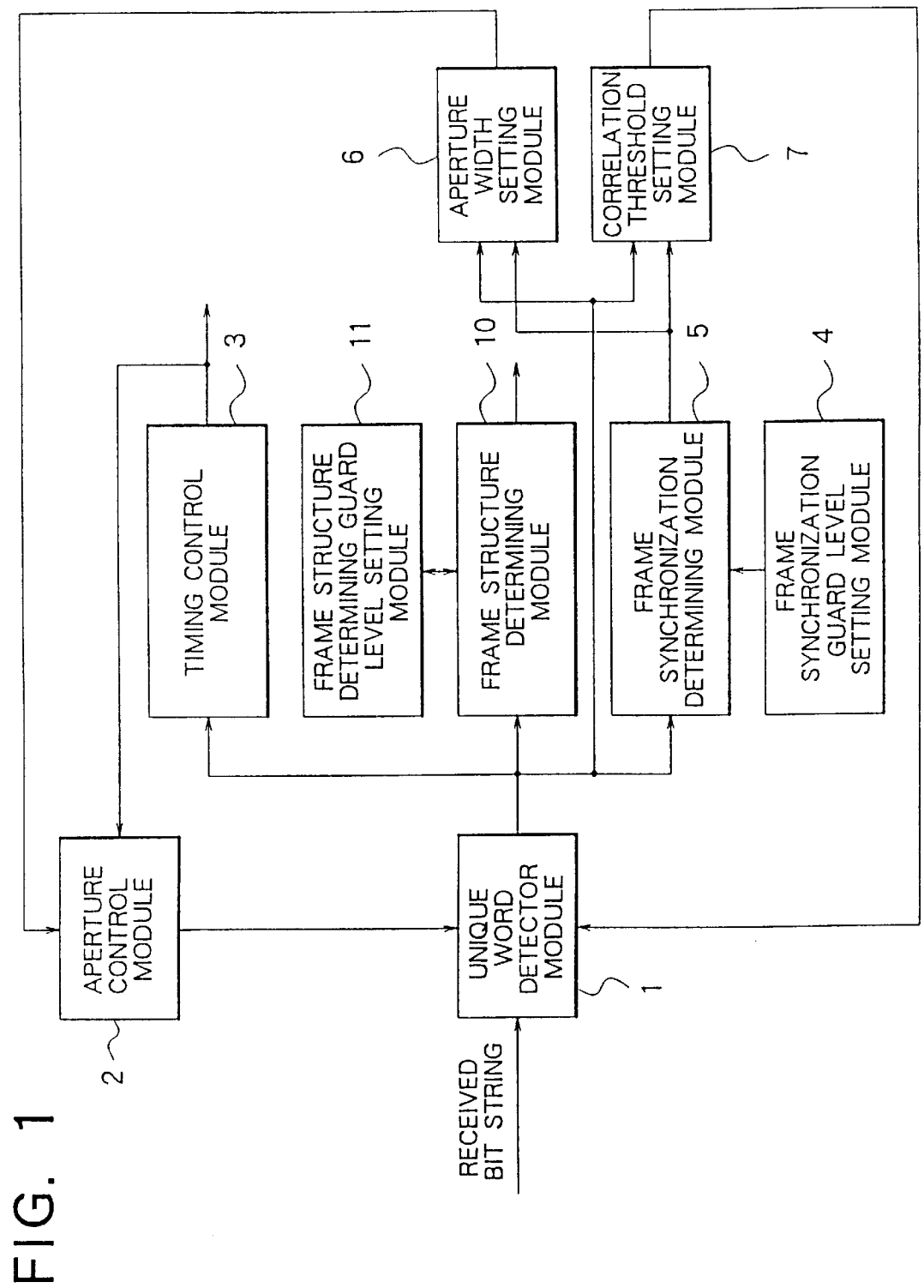
FIG. 1 is a block diagram showing the configuration of the digital radio communications receiver according to an embodiment 1 of the present invention.

FIG. 1 is the block diagram showing the configuration of the digital radio communications receiver according to an embodiment 1 of the present invention.

Figure 12:
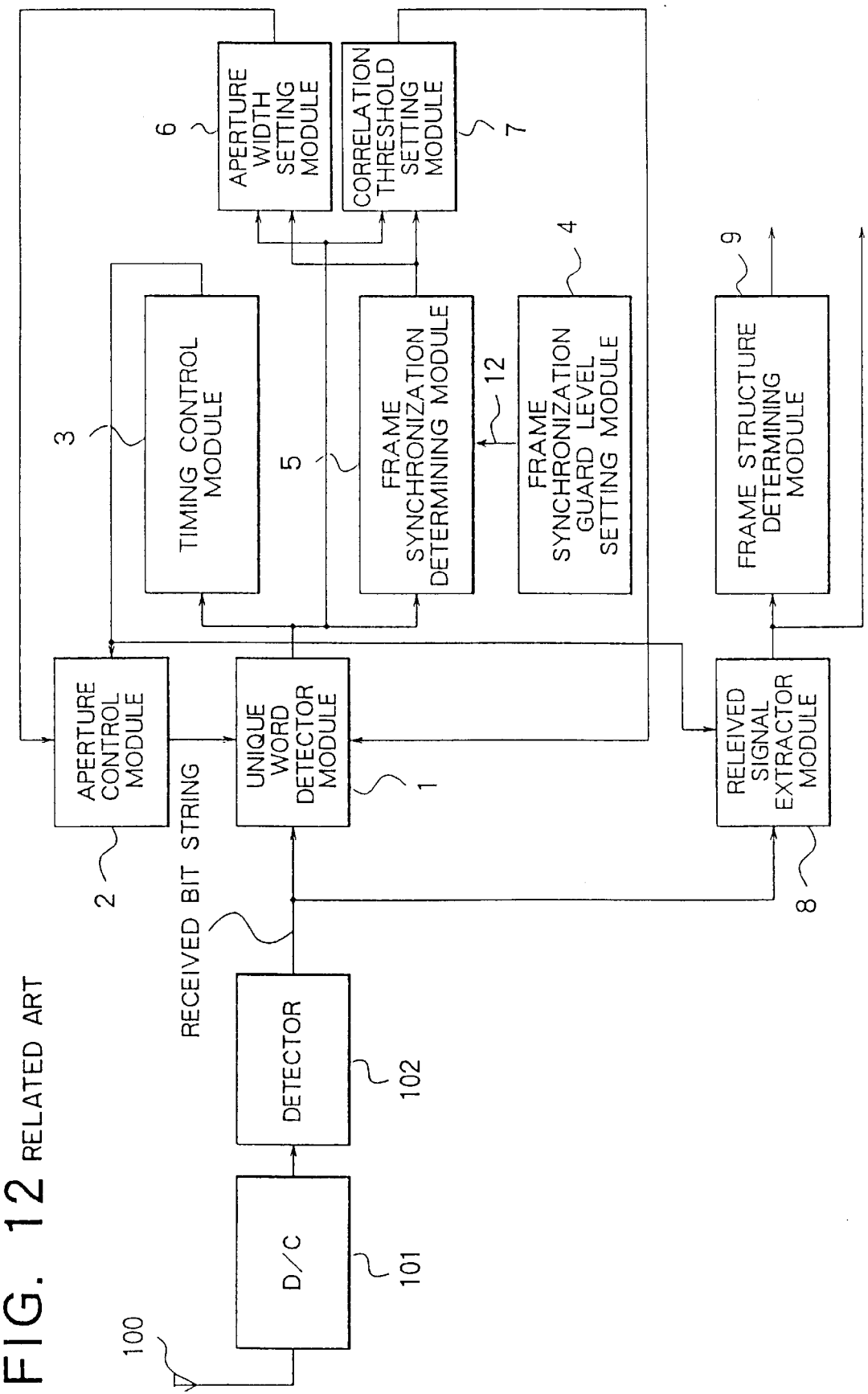
FIG. 12 is the block diagram showing the configuration of the privately known but unpublished art digital radio communications receiver.
Figure 13:
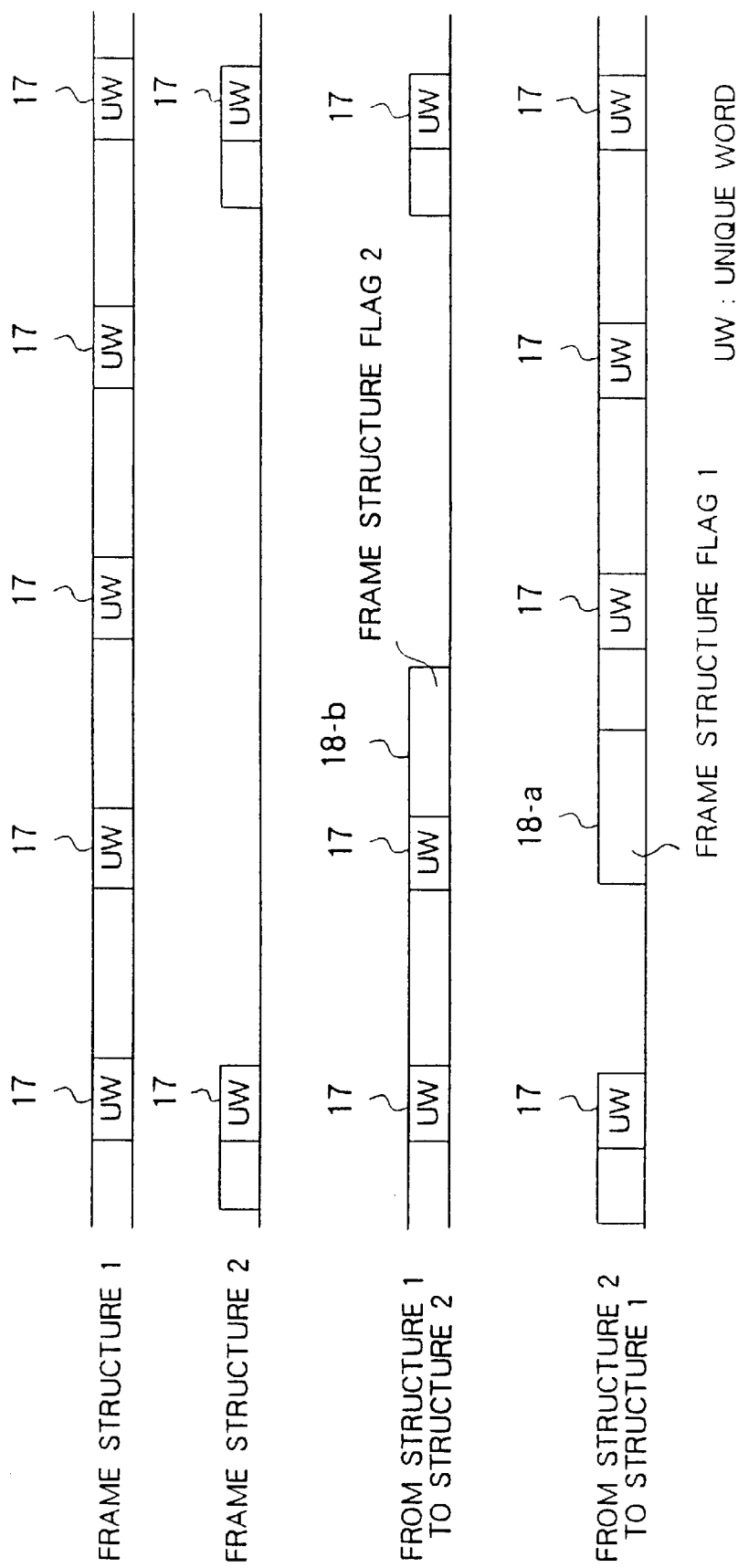
FIG. 13 illustrates the structure of frames and bursts used in the known digital radio communications receiver.
Figure 14:
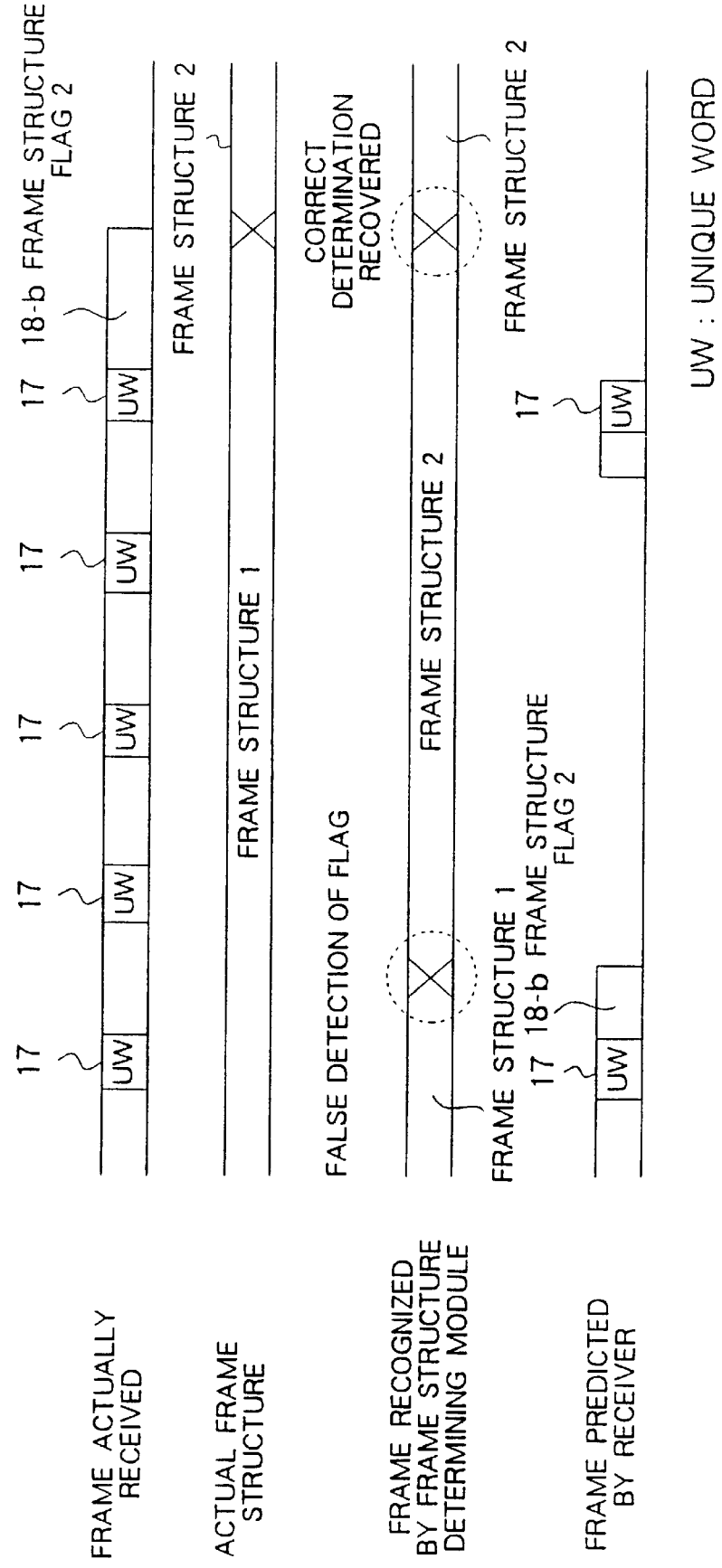
FIG. 14 illustrates the false detection of the frame structure flag in the known art.
Figure 15:
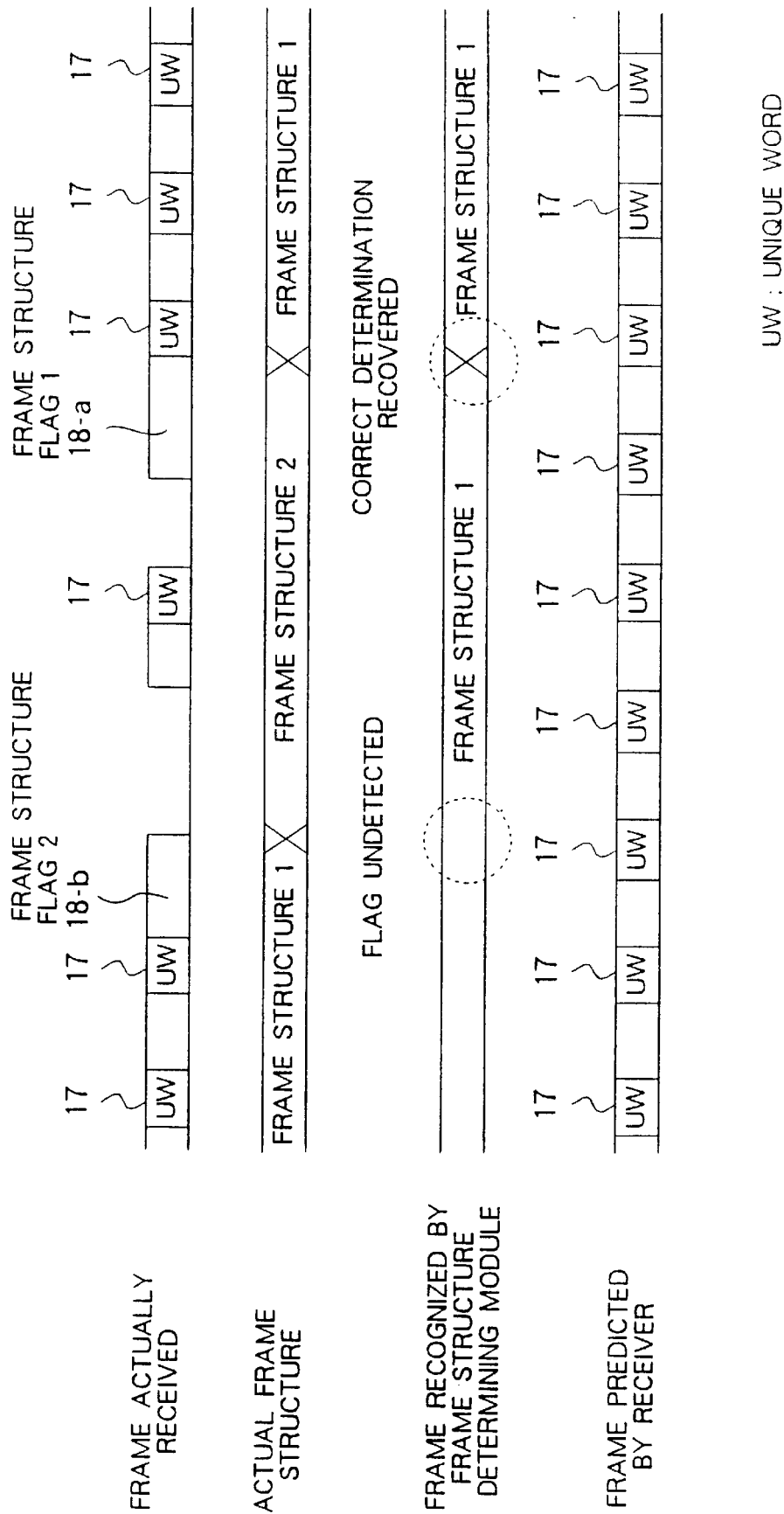
FIG. 15 illustrates the miss of the frame structure flag in the known art.
Figure 16:
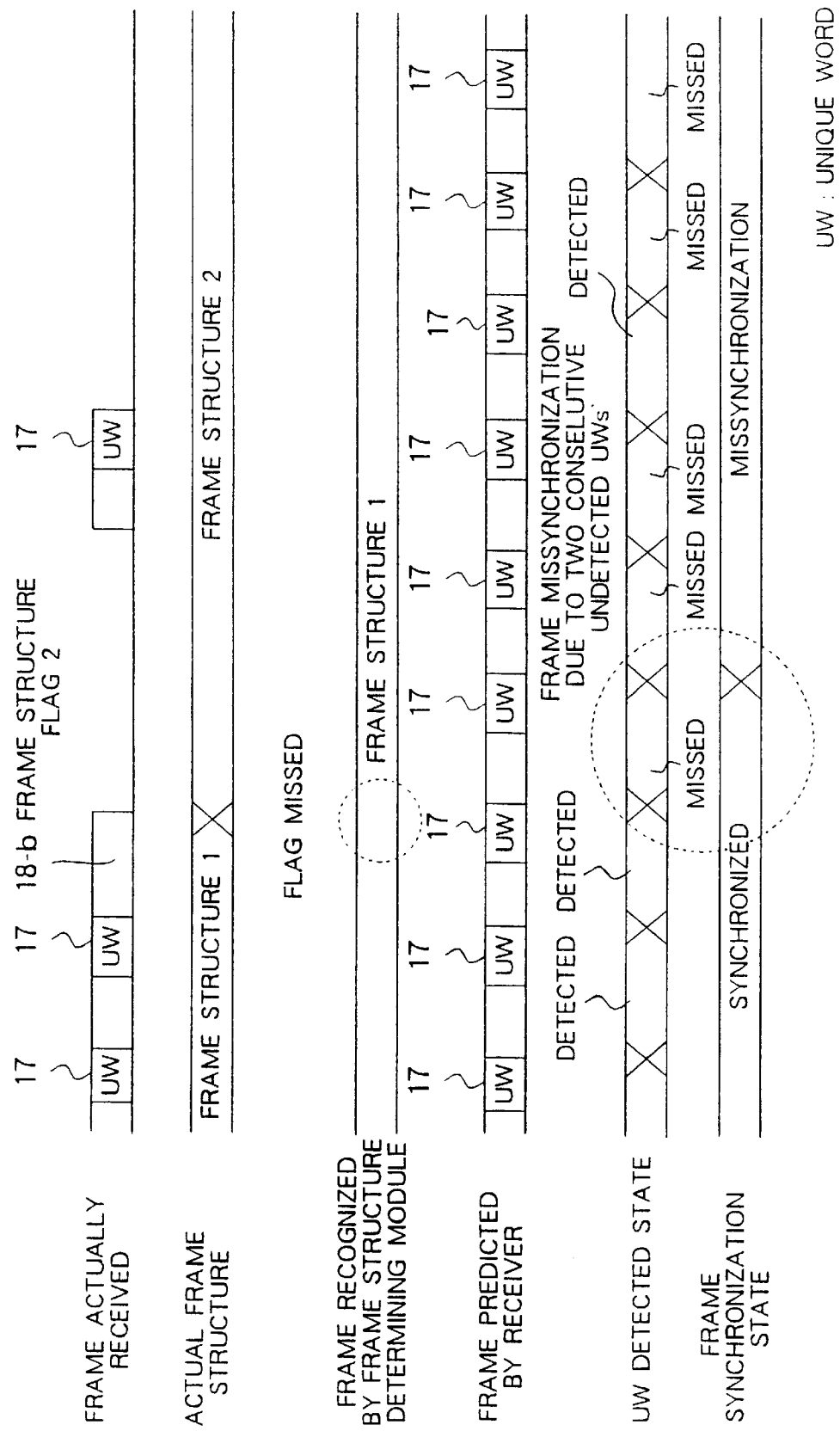
FIG. 16 illustrates the effect of the miss of the frame structure flag.

In FIG. 1, components identical to those in the known art in FIG. 12 are designated with the same reference numerals, and their description is not repeated herein. There are shown further a frame structure determining module 10 for determining the frame structure based on the unique word detection information from the unique word detector module 1 and the frame structure determining guard level and for outputting the determination results, and a frame structure determining guard level setting module 11 for setting the guard level that is the number of consecutive detections of the frame structure in frame structure determining conditions and for outputting the guard level to the frame structure determining module 10.

Receive timing control section for timing controlling of the received frame based on the unique word detection information from the unique word detector module 1 is constituted by the aperture control module 2, timing control module 3, frame synchronization guard level setting module 4, frame synchronization determining module 5, aperture width setting module 6 and correlation threshold setting module 7.

In the same way as in the known art in FIG. 12, in the digital communications receiver in FIG. 1, the received bit string fed to the unique word detector module 1 is derived by detecting, with the detector 102, the received signal in the intermediate frequency band that is output by the downconverter 101 in response to the radiowave received at the receiving antenna 100. The receiver also comprises the unshown received signal extractor module 8 for extracting the received signal from the received bit string output by the detector 102 at the timing designated by the timing control module 3.

The operation of the embodiment 1 is now discussed referring to FIG. 1.

As shown, the operation of the unique word detector module 1 for outputting the unique word detection information and the operation of the timing control module 3 are identical to those in the known art, and their description is not repeated herein.

The frame structure determining guard level setting module 11 sets the guard level to the frame structure determining module 10.

The frame structure determining module 10 predicts the frame structure from the detected intervals of the unique word based on the unique word detection information and the frame structure determining guard level.

The frame synchronization determining module 5, frame synchronization guard level setting module 4, aperture width setting module 6 and correlation threshold setting module 7 operate in the same way as in the known art, and their operations are not discussed herein again.

The embodiment 1 is different from the known art in that the frame structure determining module 10 determines the frame structure based on the detected intervals of the unique words derived from the unique word detection information and predicts the frame structure based on the guard level 23 for frame structure determination.

Figure 2:
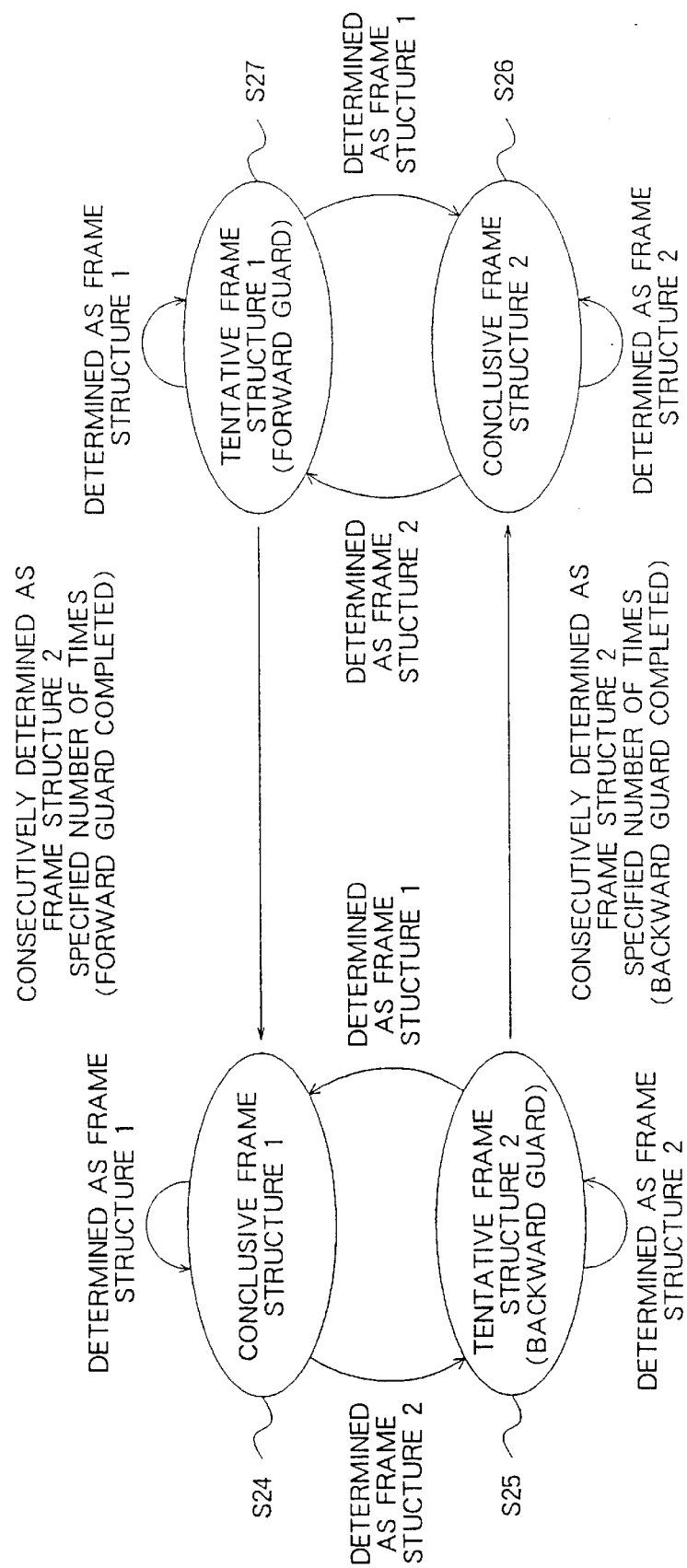
FIG. 2 is a state transition chart of the digital radio communications receiver in the embodiment 1 of the present invention uses in the determination of the received frame structure.

The prediction results are illustrated in the state transition chart in FIG. 2.

The transition from a frame structure 1 (S24) to a frame structure 2 (S26) is made only when the determination that the frame is at the frame structure 2 is consecutively repeated the specified number of times (referred to as the backward guard level for frame structure determination). When the number of the determinations is less than specified number of times, it is determined that the frame is at a tentative frame structure 2 (S27). Similarly, the transition from the frame structure 2 (S26) to the frame structure 1 (S24) is made only when the determination that the frame is at the frame structure 1 is consecutively repeated the specified number of times (referred to as the forward guard level for frame structure determination. Both the backward and forward guard levels are collectively called as guard level for frame structure determination.) When the number of determinations is less than the specified number of times, it is determined that the frame is at the tentative frame structure 2 (S27).

The method of determining the frame structure using the detected intervals of the unique word of the unique word detection information 3 is now discussed.

Figure 3:
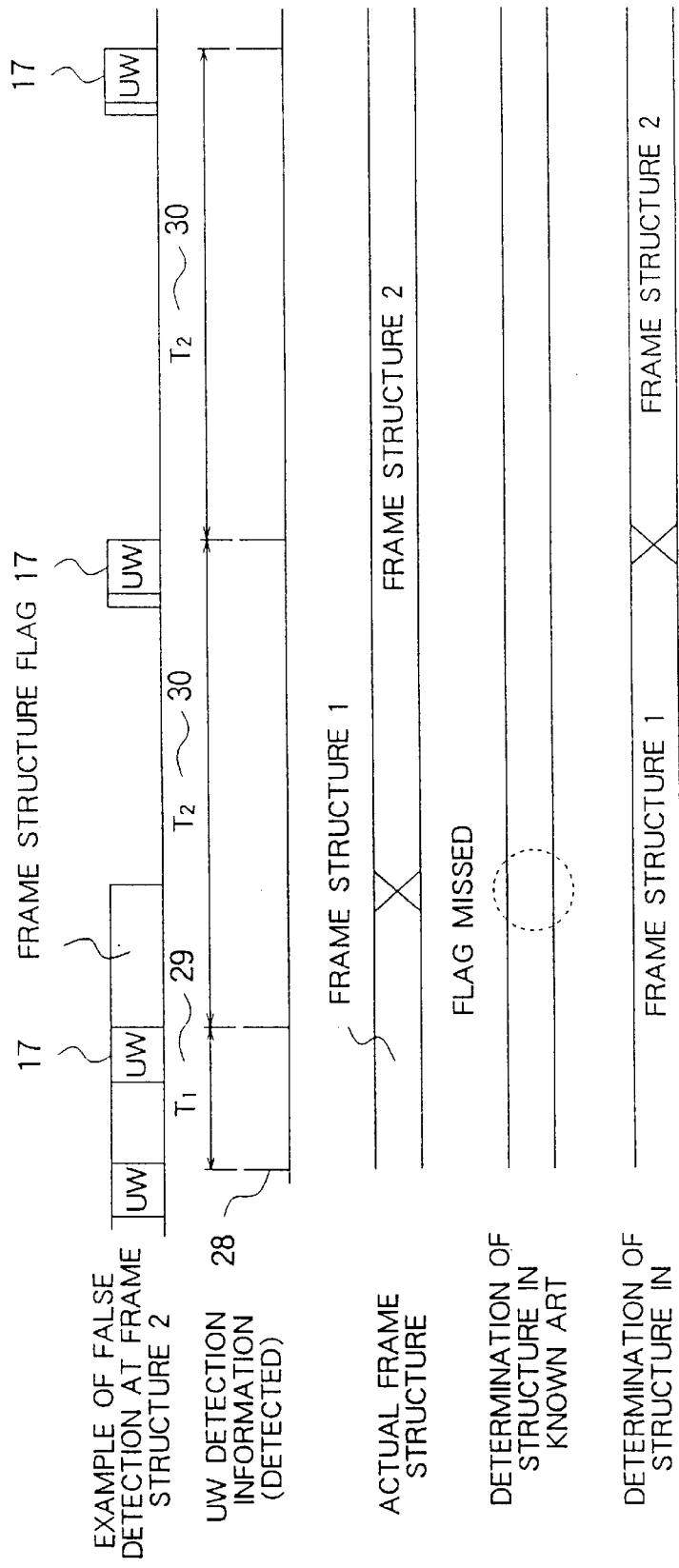
FIG. 3 illustrates a miss of a frame structure flag in the embodiment 1.

FIG. 3 illustrates the miss of a frame structure flag.

Referring to FIG. 3, part of the unique word detection information is a detected pulse 28 that is output when a unique word is detected. There are also shown intervals 29 at which each unique word is transmitted in the frame structure 1 and intervals 30 at which each unique word is transmitted in the frame structure 2.

When the frame is changed from frame structure 1 to frame structure 2 and if the frame structure flag goes undetected in the known art, the determination of the frame structure remains unchanged from the frame structure 1. In the embodiment 1, however, it is determined that the frame is at structure 2 based on the matter that the unique word is detected at intervals of T2.

Figure 4:
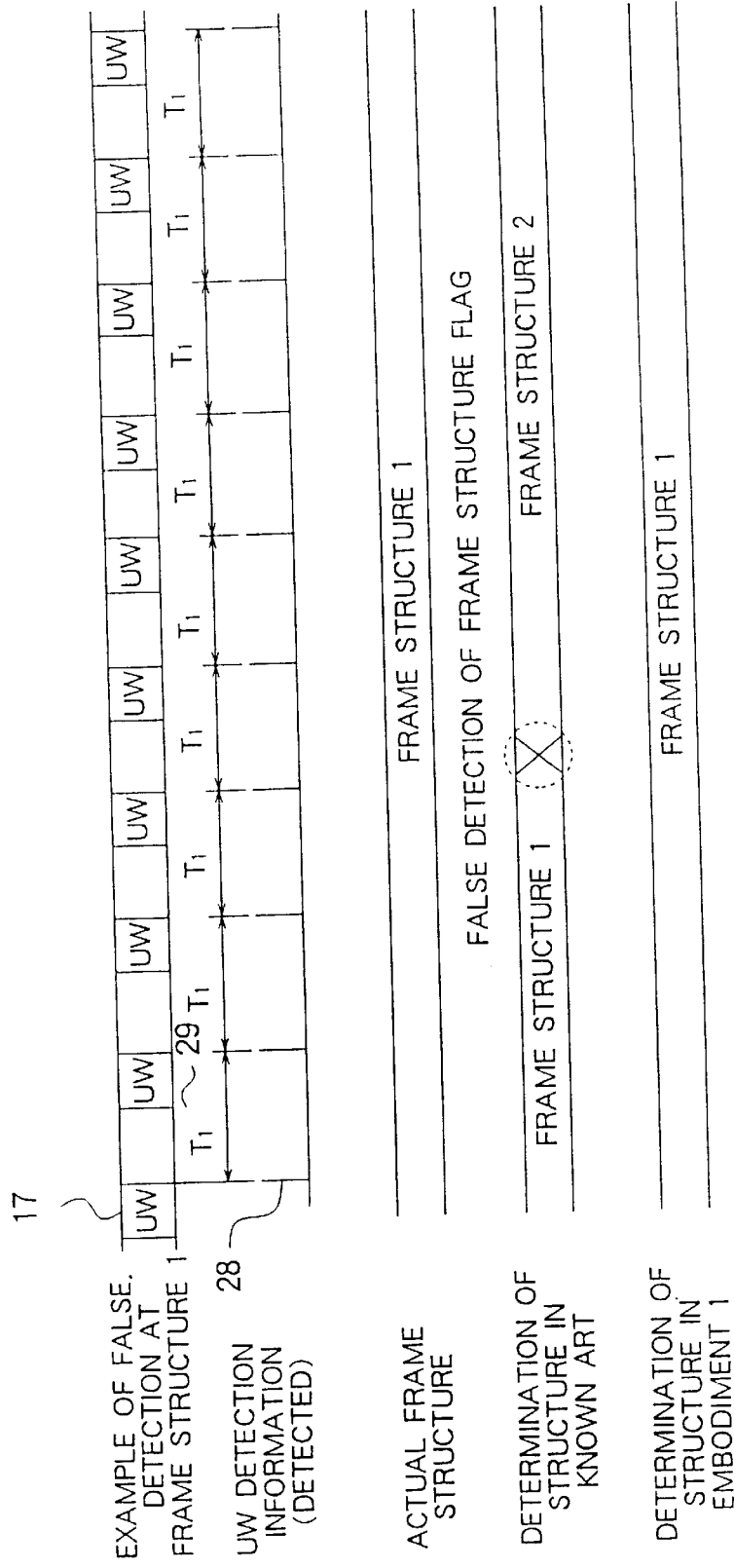
FIG. 4 illustrates a false detection of a frame structure flag in the embodiment 1.

FIG. 4 shows an example of the false detection of the frame structure flag.

Although the frame remains unchanged from structure 1, the known art may detect a false frame structure flag in the middle, leading to an erroneous determination that the frame is at frame structure 2. According to the embodiment 1, however, it is determined that the frame is at structure 2 based on the matter that the unique word is detected at intervals of T1.

Figure 5:
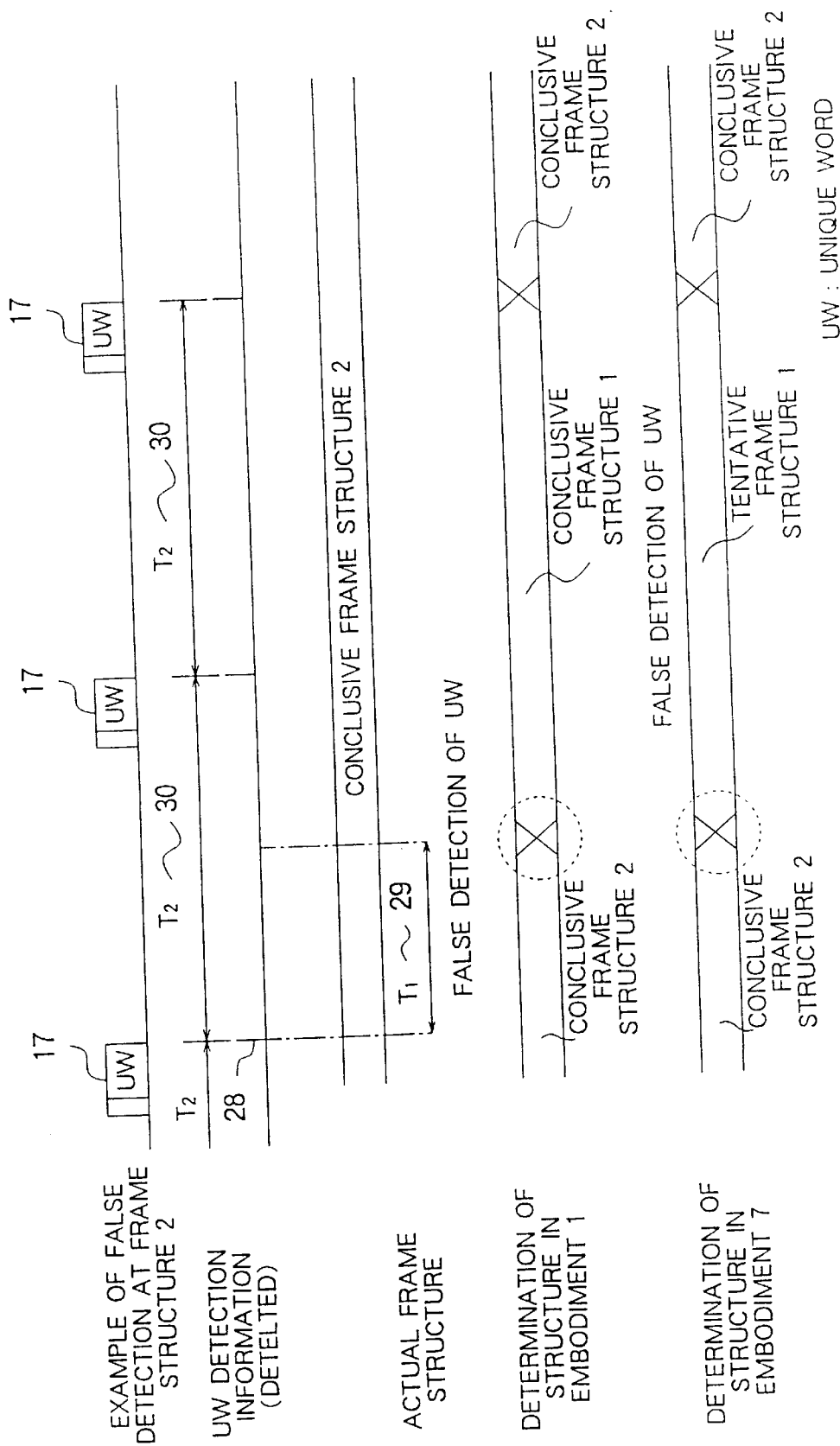
FIG. 5 illustrates an example of frame structure determination in the false detection of a unique word.

FIG. 5 shows the example of frame structure determination in which a false detection of the unique word takes place though the frame remains unchanged. If the unique word detected at intervals T1 is immediately used to determine that the frame is at the frame structure 1, associated control modules using the erroneous determination results perform erroneous controlling.

In the embodiment 1, however, the frame is determined as the tentative frame structure 1 so that the associated control modules perform controlling that is compatible with the frame structure 1 and the frame structure 2, and thus erroneous controlling is avoided.

Since the detected intervals of the unique word are used to determine the frame structure in the embodiment 1 as described above, the result of the detection of the frame structure flag does not affect the determination of the frame structure. Thus, the determination of the frame structure is correctly performed regardless of whether the fame structure flag is falsely detected or missed.

Furthermore, the frame structure is determined referring to the guard level. Even when the unique word is falsely detected or missed, the frame is not determined as a conclusive frame structure unless false detection or miss of the unique word is consecutively repeated by the specified guard level. The frame structure determined becomes more reliable.

The embodiment 1 thus determines the frame structure without determining the frame structure flag, and the probability of erroneous determination of the frame structure is reduced.

Although in the embodiment 1, the intervals of the unique words are used to determine the frame structure, the frame structure flag or the frame structure and the intervals of the unique words in combination may be employed. In this case, however, the receiver has a total design that allows the frame structure flag to be consecutively issued a plurality of times.

In the embodiment 1, the detected intervals of the unique word are used to determine the frame structure. When the phase of the unique word differs between the frame structures, however, the detection of the phase of the unique word may be used. The above-described operation of the embodiment 1 remains the same.

Embodiment 2

Figure 6:
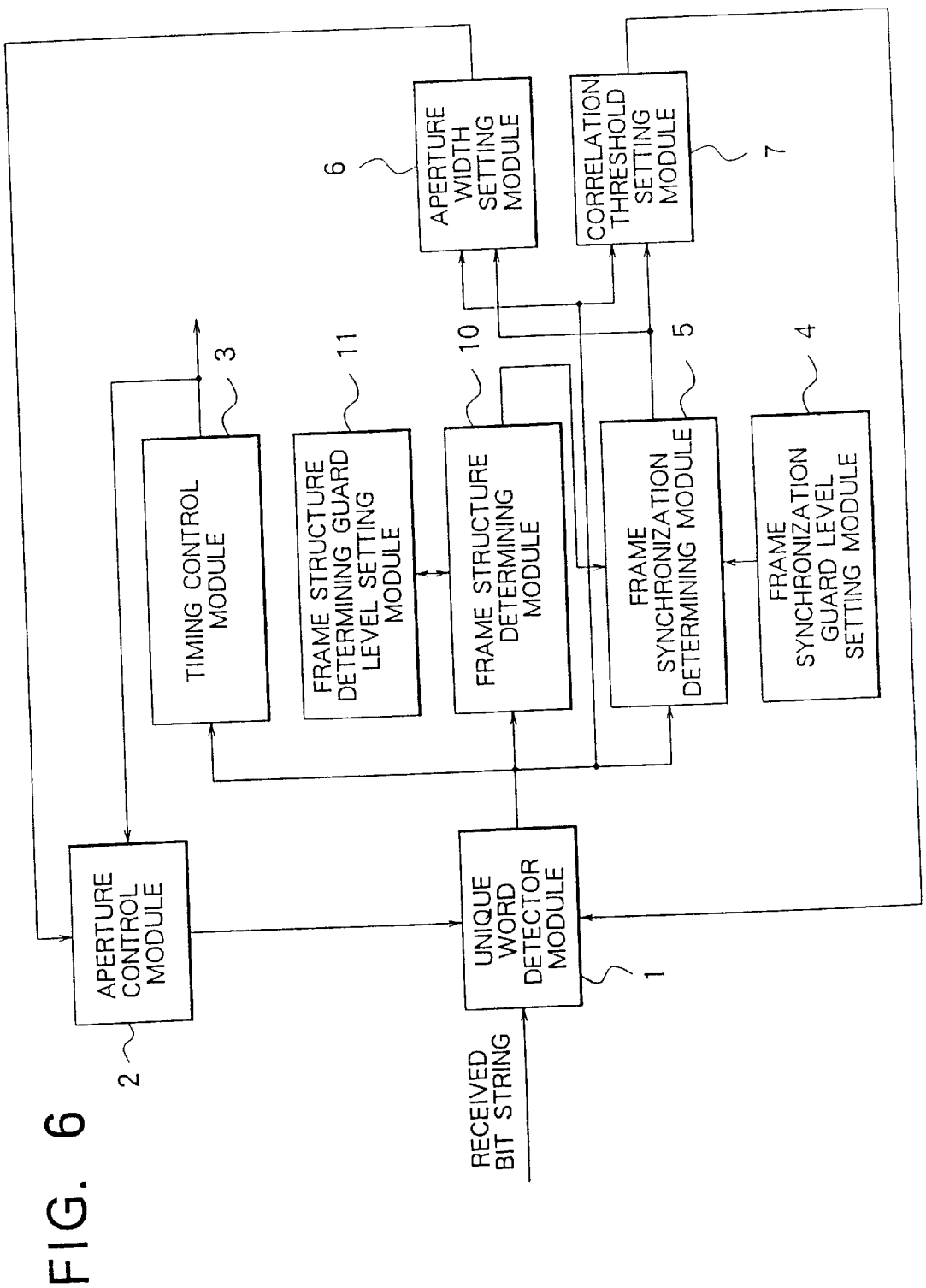
FIG. 6 is a block diagram showing the configuration of the digital radio communications receiver according to an embodiment 2 of the present invention.

FIG. 6 is the block diagram showing the configuration of the digital radio communications receiver according in the embodiment 2 of the present invention.

In the embodiment 1, the unique word and the guard level for frame synchronization are used to determine the frame synchronization. In the embodiment 2, the guard level for frame structure determination is additionally used to determine the frame synchronization.

In FIG. 6, components identical to those in the embodiment 1 in FIG. 1 are designated with the same reference numerals. As shown, the frame synchronization determining module 5 receives the frame structure information from the frame structure determining module 10, determines the frame synchronization state, and outputs the determination results as the frame synchronization information.

The operation of the embodiment 2 is now discussed referring to FIG. 6.

In FIG. 6, the unique word detector module 1 for outputting the unique word detection information, timing control module 3, aperture width setting module 6 and correlation threshold setting module 7 operate in the same way as in the embodiment 1, and thus the discussion of their operation is not repeated herein.

The frame structure determining module 10 determines the frame structure based on the unique word detection information, and outputs the results as the frame structure information.

The frame synchronization determining module 5 determines the frame synchronization state, based on the unique word detection information from the unique word detector module 1, the frame structure information from the frame structure determining module 10, and the consecutive detection/miss times of the unique word detection information specified by the guard level for frame synchronization coming from the frame synchronization guard level setting module 4. The frame synchronization determining module 5 outputs the determination results as the frame synchronization information.

The embodiment 2 is different from the embodiment 1 in that, to determine the frame synchronization, the frame synchronization determining module 5 uses not only the unique word detection information and the guard level for frame synchronization but also the frame structure information coming from the frame structure determining module 10.

It is obvious that the embodiment 2 offers the same advantage as the embodiment 1 when the embodiment 2 determines the frame structure based on the guard level.

Figure 7:
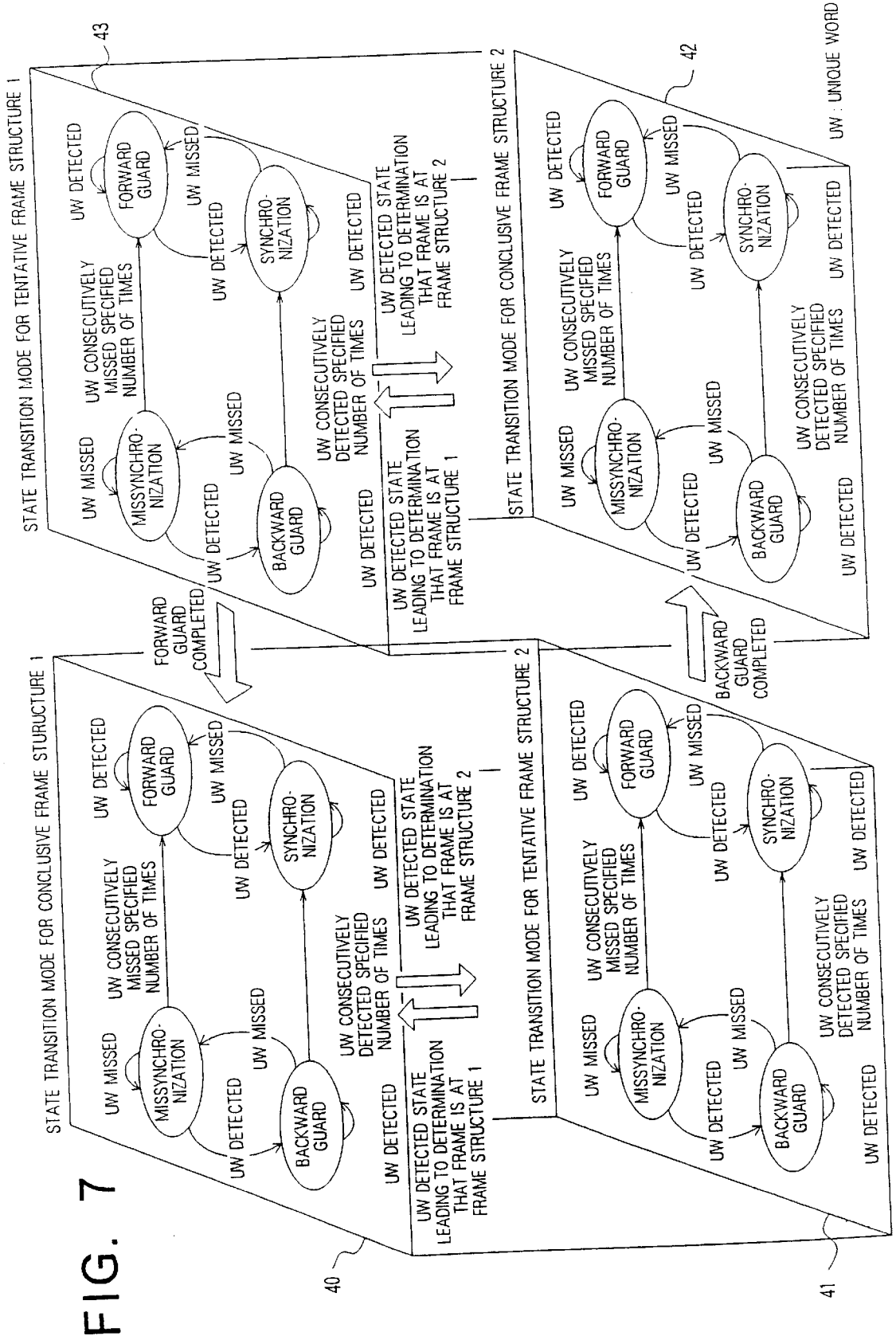
FIG. 7 is a state transition chart of the digital radio communications receiver in the embodiment 2 of the present invention uses in frame synchronization.

As shown in the frame synchronization state transition chart in FIG. 7, depending on the determination of the frame structure, the synchronization control changes its mode from a state transition mode 40 to 41, 41 to 42, 42 to 43, and then 43 to 40. Thus, a flexible frame synchronization control is performed.

The embodiment 2 therefore determines the frame structure without determining the frame structure flag, the erroneous determination of the frame structure is less likely to take place, and a flexible synchronization control is performed.

All modifications and changes described in connection with the embodiment 1 also work in the embodiment 2.

Embodiment 3

Figure 8:
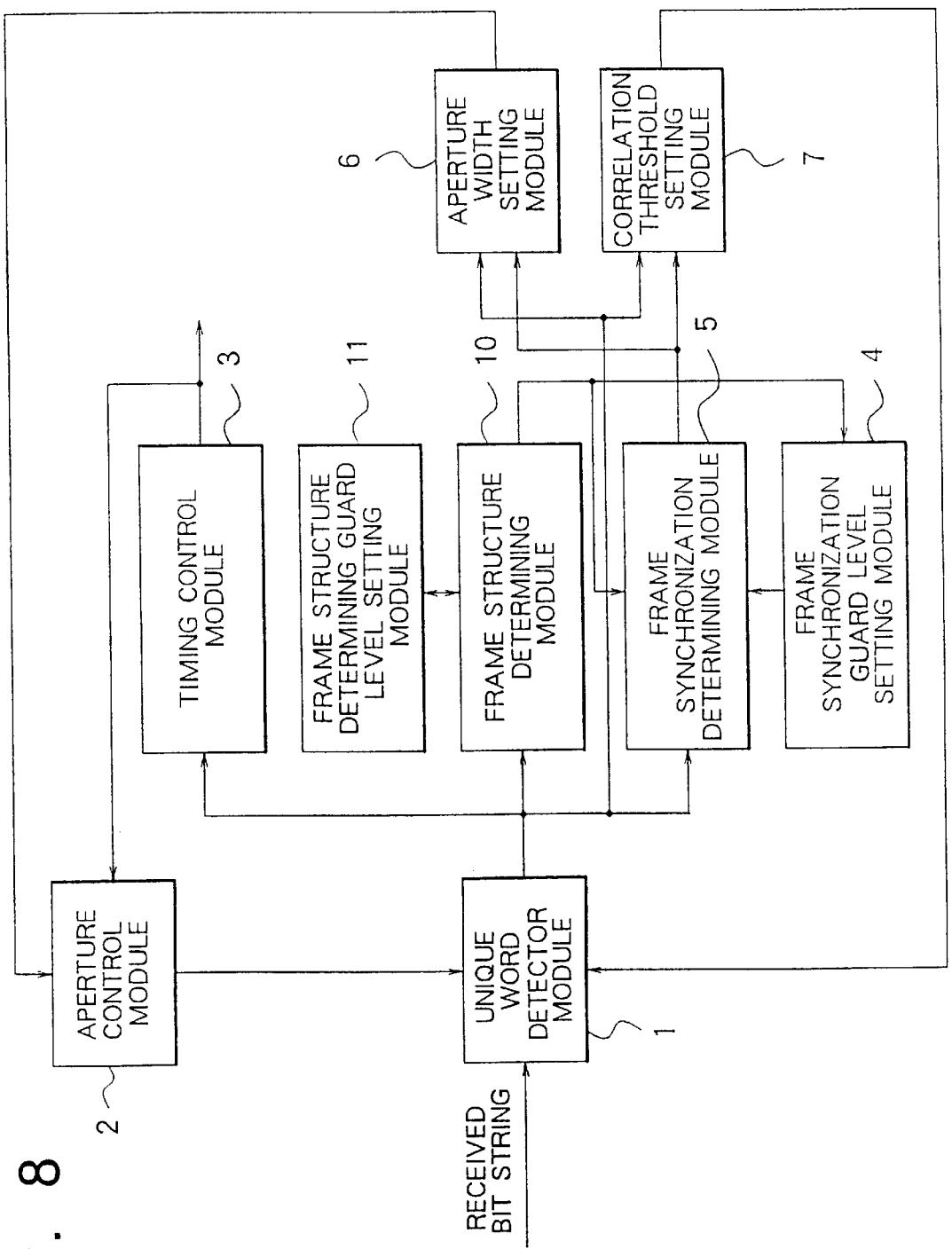
FIG. 8 is a block diagram showing the configuration of the digital radio communications receiver according to an embodiment 3 of the present invention.

FIG. 8 is the block diagram showing the configuration of the digital radio communications receiver in the embodiment 3 of the present invention.

The change in the frame structure is typically associated with the change in the frame length and the unique word length in many cases. When a signal is coming in from a different station, SNR (signal to noise ratio) suffers variations depending on the frame structure. To acquire stable frame synchronization, frame structure determination information is used to set the guard level for frame synchronization.

In FIG. 8, components identical to those in the embodiment 2 in FIG. 6 are designated with the same reference numerals. The frame synchronization guard level setting module 4, as the frame synchronization control parameter setting means, is designed to receive the frame structure information from the unique word detector module 1.

The embodiment 3 in FIG. 8 is now discussed.

In FIG. 8, the unique word detector module 1 for outputting the unique word detection information, timing control module 3, aperture width setting module 6 and correlation threshold setting module 7 operate in the same way as in the embodiment 2, and thus the discussion of their operation is not repeated herein.

The frame structure determining module 10 determines the frame structure based on the unique word detection information, and outputs the results as the frame structure information.

The frame synchronization guard level setting module 4 sets, as the frame synchronization control parameter, the guard level appropriate for each receive frame based on the frame structure information from the frame structure determining module 10. The guard level for frame synchronization is, for example, "4" for the tentative frame structure 1 during frame synchronization, and "3" for the conclusive frame structure 2 during frame synchronization.

The frame synchronization determining module 5 determines the frame synchronization state, based on the unique word detection information from the unique word detector module 1 and the consecutive detection times of the unique word detection information specified by the guard level for frame synchronization coming from the frame synchronization guard level setting module 4, and then outputs the determination results as the frame synchronization information.

The embodiment 3 is different from the embodiments 1 and 2 in that the frame synchronization guard level setting module 4 sets the guard level for frame synchronization based on not only the unique word detection information and the frame synchronization information but also the frame structure information coming in from the frame structure determining module 10.

It is obvious that the embodiment 3 offers the same advantage as the embodiment 1 when the embodiment 3 determines the frame structure based on the guard level.

Since the state transition modes for the frame synchronization control and the guard level for frame synchronization are modified based on the determination result of the frame structure, a flexible frame synchronization control is performed.

The embodiment 3 therefore determines the frame structure without determining the frame structure flag, the erroneous determination of the frame structure is less likely to take place, and a flexible synchronization control is performed.

All modifications and changes described in connection with the embodiment 1 also work in the embodiment 3.

Embodiment 4

Figure 9:
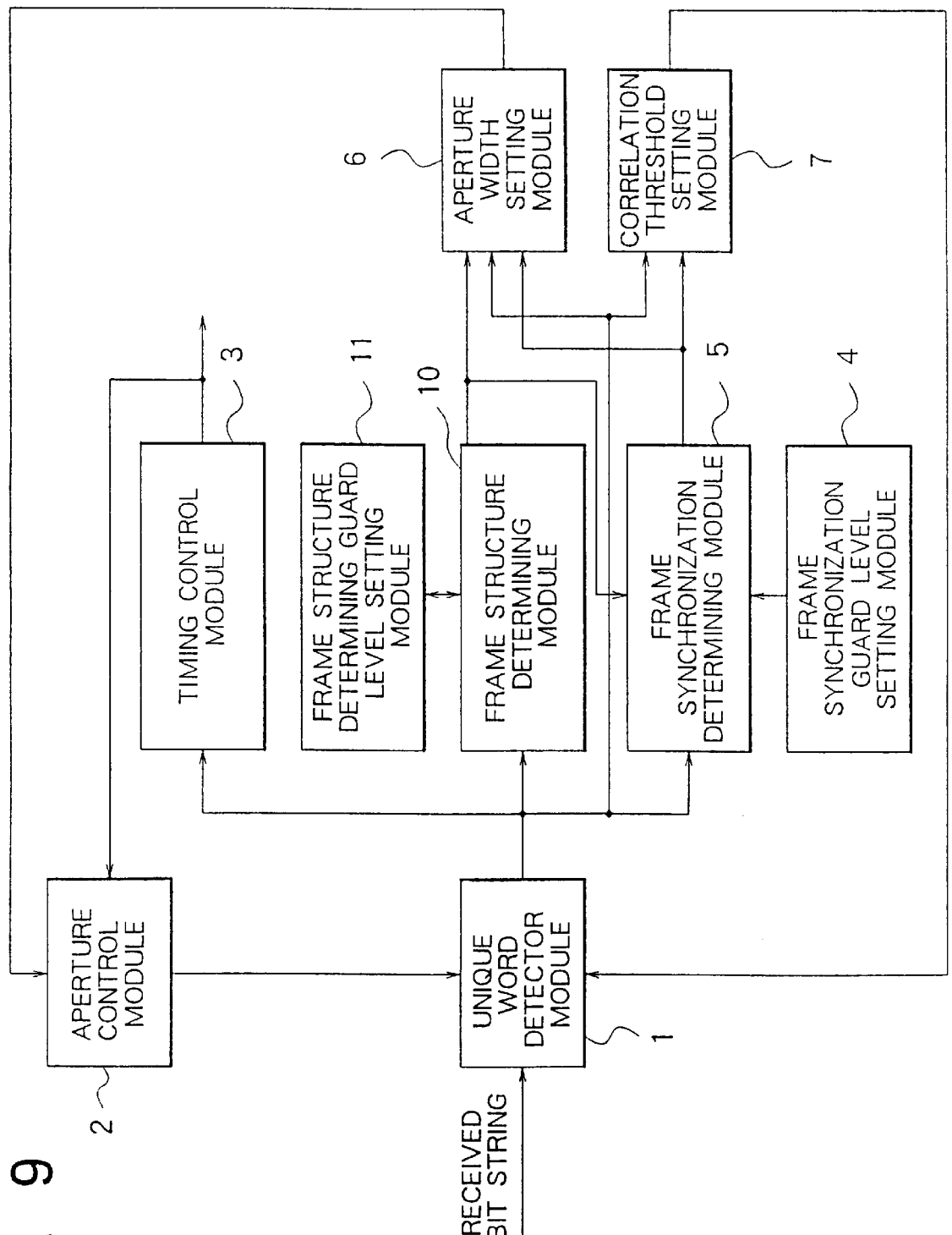
FIG. 9 is a block diagram showing the configuration of the digital radio communications receiver according to an embodiment 4 of the present invention.

FIG. 9 is the block diagram showing the configuration of the digital radio communications receiver in the embodiment 4 of the present invention.

The change in the frame structure is typically associated with the change in the frame length and the unique word length in many cases. As shown in the known art, the frame structure of continuous frames switches to the frame structure of burst form in some cases. In such a case, the quantity of drift of clocks varies depending on the frame structure, and the degree of shift in the timing of the unique word varies. To achieve a stable frame synchronization in such a case, the embodiment 4 sets the aperture width based on the frame structure determination information.

In FIG. 9, components identical to those in the embodiment 2 in FIG. 6 are designated with the same reference numerals. As shown, the aperture width setting module 6, as the frame synchronization control parameter setting means, is designed to receive the frame structure information 19.

The operation of the embodiment 4 is now discussed referring to FIG. 9.

In FIG. 9, the unique word detector module 1 for outputting the unique word detection information, timing control module 3, frame synchronization guard level setting module 4, frame synchronization determining module 5, correlation threshold setting module 7 and frame structure determining module 10 operate in the same way as in the embodiment 2, and thus the discussion of their operation is not repeated herein.

The aperture width setting module 6 sets, as the frame synchronization control parameter, the aperture width, based on the unique word detection information from the unique word detector module 1, the frame structure information from the frame structure determining module 10, and the frame synchronization information from the frame synchronization determining module 5. The aperture width set is, for example, "1" for the tentative frame structure 1 during synchronization, and "13" for the conclusive frame structure 2 during synchronization.

The embodiment 4 is different from the embodiment 2 in that the aperture setting module 6 sets the aperture based on not only the unique word detection information and the frame synchronization information but also the frame structure information coming in from the frame structure determining module 10.

It is obvious that the embodiment 4 offers the same advantage as the embodiment 2 when the embodiment 4 determines the frame structure based on the guard level.

Since the state transition modes for the frame synchronization control and the aperture width are modified based on the determination result of the frame structure, a flexible frame synchronization control is performed.

The embodiment 4 therefore determines the frame structure without determining the frame structure flag, the erroneous determination of the frame structure is less likely to take place, and a flexible synchronization control is performed.

All modifications and changes described in connection with the embodiment 1 also work in the embodiment 4.

Embodiment 5

Figure 10:
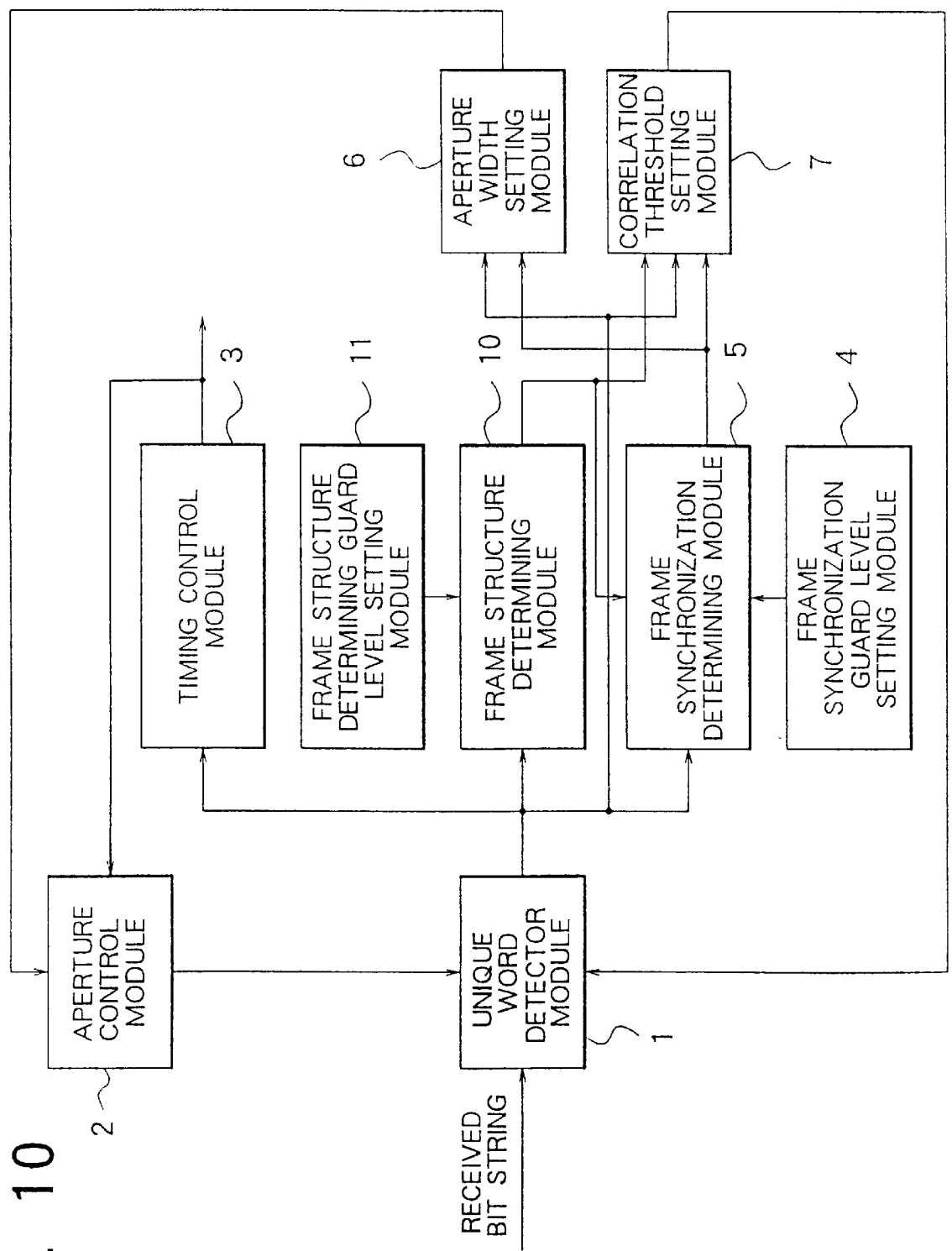
FIG. 10 is a block diagram showing the configuration of the digital radio communications receiver according to an embodiment 5 of the present invention.

FIG. 10 is the block diagram showing the configuration of the digital radio communications receiver in the embodiment 5 of the present invention.

When physical quantities that affect synchronization performance, such as the frame length, unique word length, SNR, and clock drift, vary in the preceding embodiments 3 and 4 as the frame structure changes, deterioration in synchronization performance is prevented by changing the correlation threshold. In the embodiment 5, the frame structure determination information is used in setting the correlation threshold so that a reliable frame synchronization is achieved.

In FIG. 10, components identical to those in the embodiment 2 are designated with the same reference numerals.

The correlation threshold setting module 7, as the frame synchronization control parameter setting means, is designed to receive the frame structure information 19.

The operation of the embodiment 5 is now discussed referring to FIG. 10.

In FIG. 10, the unique word detector module 1 for outputting the unique word detection information, timing control module 3, frame synchronization guard level setting module 4, frame synchronization determining module 5, aperture width setting module 6 and frame structure determining module 10 operate in the same way as in the embodiment 2, and thus the discussion of their operation is not repeated herein.

The correlation threshold setting module 7 sets, as the frame synchronization control parameter, the correlation threshold, based on the unique word detection information from the unique word detector module 1, the frame structure information from the frame structure determining module 10, and the frame synchronization information from the frame synchronization determining module 5, and outputs the results as the correlation threshold. The correlation threshold set is, for example, "4" for the tentative frame structure 1 during frame synchronization and "6" for the frame structure 2 during frame synchronization.

The embodiment 5 is different from the embodiment 2 in that the correlation threshold setting module 7 sets the correlation threshold based on not only the unique word detection information and the frame synchronization information but also the frame structure information coming in from the frame structure determining module 10.

It is obvious that the embodiment 5 offers the same advantage as the embodiment 2 when the embodiment 5 determines the frame structure based on the guard level.

Since the state transition modes for the frame synchronization control and the correlation threshold are modified based on the determination result of the frame structure, a flexible frame synchronization control is performed.

The embodiment 5 therefore determines the frame structure without determining the frame structure flag, the erroneous determination of the frame structure is less likely to take place, and a flexible synchronization control is performed.

All modifications and changes described in connection with the embodiment 1 also work in the embodiment 5.

Embodiment 6

Figure 11:
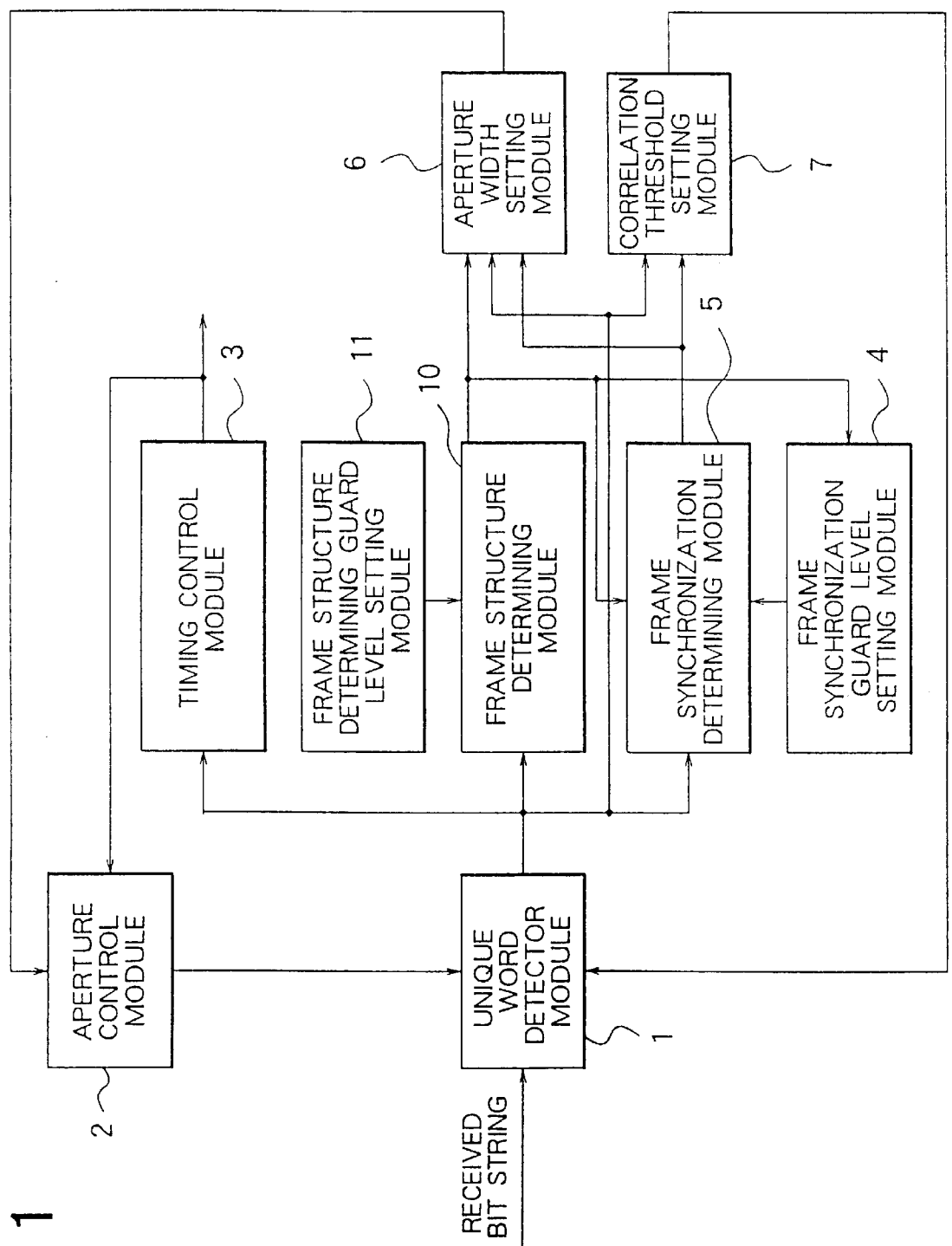
FIG. 11 is a block diagram showing the configuration of the digital radio communications receiver according to an embodiment 6 of the present invention.

FIG. 11 is the block diagram showing the configuration of the digital radio communications receiver in the embodiment 6 of the present invention.

In the preceding embodiments 3 through 5, the frame structure information is used to set the guard level for frame synchronization, aperture width and correlation threshold on an individual basis. Alternatively, two or all of them may be concurrently set in combination. In the embodiment 6, all these synchronization control parameters are concurrently set.

In FIG. 11, components identical to those in the embodiment 2 in FIG. 6 are designated with the same reference numerals. The frame synchronization guard level setting module 4, aperture width setting module 6 and correlation threshold setting module 7 are designed to receive the frame structure information from the frame structure determining module 10.

The operation of the embodiment 6 is discussed referring to FIG. 11.

In FIG. 11, the unique word detector module 1 for outputting the unique word detection information, timing control module 3, frame synchronization determining module 5, and frame structure determining module 10 operate in the same way as in the embodiment 2, and thus the discussion of their operation is not repeated herein.

The frame synchronization guard level setting module 4 sets the guard level appropriate for each receive frame based on the frame structure information from the frame structure determining module 10.

The aperture width setting module 6 sets the aperture width, based on the unique word detection information from the unique word detector module 1, the frame structure information from the frame structure determining module 10, and the frame synchronization information from the frame synchronization determining module 5 and outputs the results as the aperture width.

The correlation threshold setting module 7 sets the correlation threshold, based on the unique word detection information from the unique word detector module 1, the frame structure information from the frame structure determining module 10, and the frame synchronization information from the frame synchronization determining module 5, and outputs the results as the correlation threshold.

The embodiment 6 is different from the embodiment 2 in that the frame synchronization guard level setting module 4, aperture width setting module 6 and correlation threshold setting module 7 perform their respective settings based on not only the unique word detection information and frame synchronization information but also the frame structure information from the frame structure determining module 10.

It is obvious that the embodiment 6 offers the same advantage as the embodiment 2 when the embodiment 6 determines the frame structure based on the guard level.

Since the state transition modes for the frame synchronization control, the guard level for frame synchronization, aperture width and correlation threshold are modified based on the determination result of the frame structure, a flexible frame synchronization control is performed.

The embodiment 6 therefore determines the frame structure without determining the frame structure flag, the erroneous determination of the frame structure is less likely to take place, and a flexible synchronization control is performed.

All modifications and changes described in connection with the embodiment 1 also work in the embodiment 6.

What is claimed is:

1. A digital radio communications receiver for use in a digital communications system having two or more frame structures on a single channel, comprising unique word detector means for detecting a unique word from a received bit string, receive timing control means for timing controlling a received frame based on the unique word detection information from said unique word detector means, frame structure determining means for determining a frame structure based on the unique word detection information from said unique word detector means and based on frame structure determining guard level, and for outputting the frame structure determination results as frame structure information, and frame structure determining guard level setting means for setting the frame structure determining guard level that is the number of consecutive detections of the frame structure as frame structure determination conditions, and for outputting the guard level to said frame structure determining means.

2. The digital radio communications receiver according to claim 1, wherein the detector means detects intervals of said unique word, and said frame structure determining means receives the unique word detection information from said unique word detector means and determines the frame structure based on the detected intervals of the unique word, and when the frame structure transitions from a preceding structure to a new one, said frame structure determining means outputs frame structure information on condition that the determination of the new frame structure is repeated consecutively by the guard level set by said frame structure determining guard level setting means.

3. The digital radio communications receiver according to claim 1 further comprising frame synchronization determining means for determining the establishment of the synchronization of the received frame based on the unique word detection information from said unique word detector means and for outputting the frame synchronization determination results as frame synchronization information, whereby said frame synchronization determining means selects the mode of the frame synchronization control based on the frame structure information from said frame structure determining means.

4. The digital radio communications receiver according to claim 1 further comprising frame synchronization control parameter setting means for setting a frame synchronization control parameter based on the frame structure information from said frame structure determining means, and feeding the frame synchronization control parameter back into synchronization control information of the received frame.

5. The digital radio communications receiver according to claim 4, wherein said frame synchronization control parameter setting means comprises the frame synchronization guard level setting means for setting, as the frame synchronization control parameter, the frame synchronization guard level that is the number of consecutive detections or the number of consecutive misses of the unique word of frame synchronization determination conditions.

6. The digital radio communications receiver according to claim 4, wherein said frame synchronization control parameter setting means comprises aperture width setting means for setting, as the frame synchronization control parameter, the aperture width that is a time width for unique word detection.

7. The digital radio communications receiver according to claim 4, wherein said frame synchronization control parameter setting means comprises correlation threshold setting means for setting, as the frame synchronization control parameter, the correlation threshold as unique word detection conditions.

* * * * *